Dec. 29, 1931.  J. A. KELLER  1,839,036
MEANS FOR CLEARING WINDSHIELDS
Filed Feb. 5, 1930
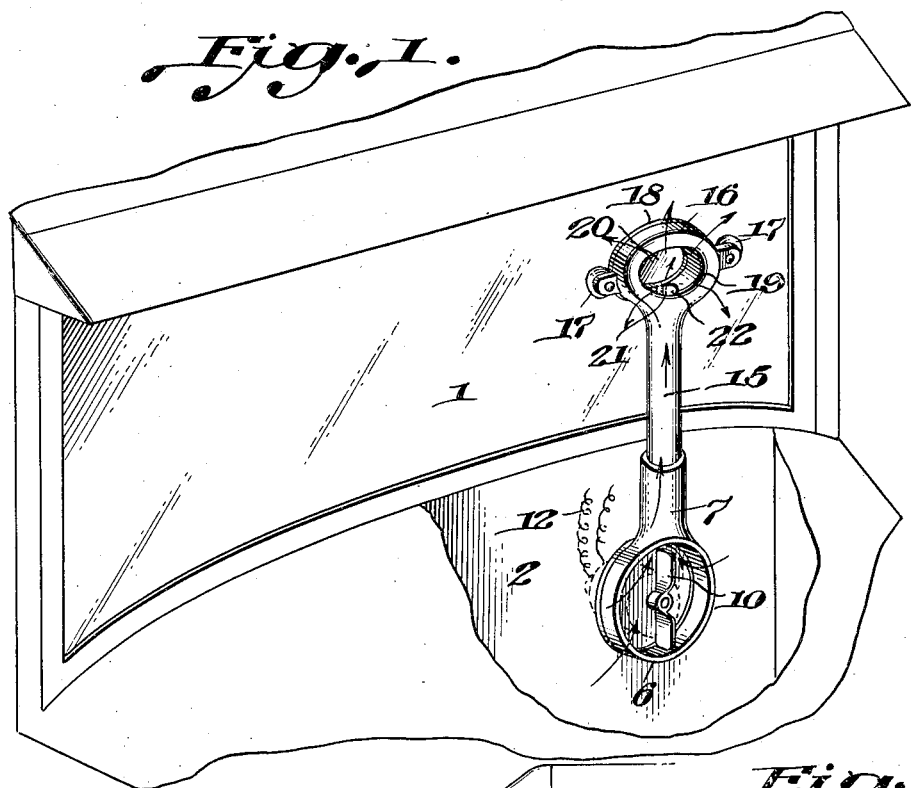
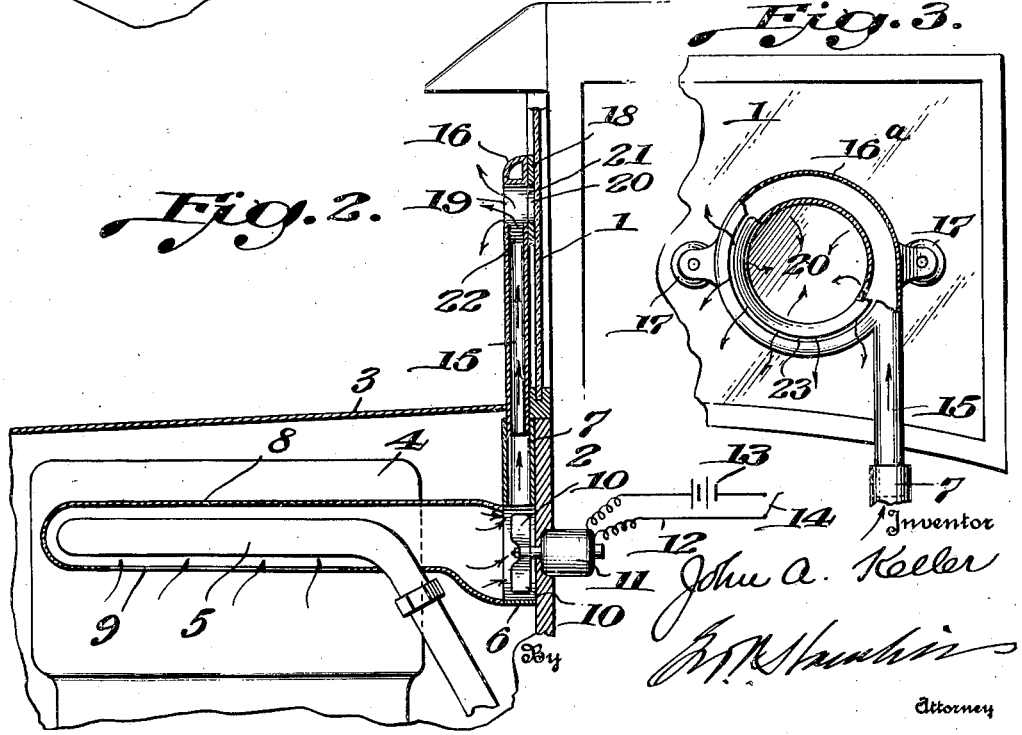
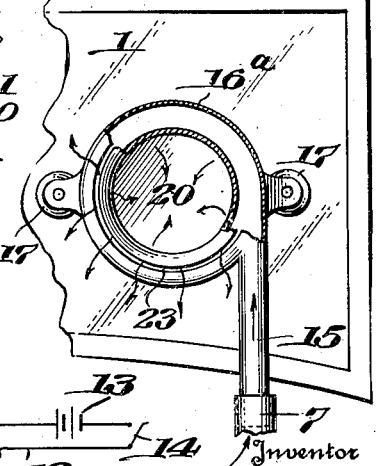
Inventor
John A. Keller
Attorney Patented Dec. 29, 1931

1,839,036

UNITED STATES PATENT OFFICE

JOHN A. KELLER, OF NEW PALTZ, NEW YORK

MEANS FOR CLEARING WINDSHIELDS

Application filed February 5, 1930. Serial No. 426,167.

This invention relates to those devices which are adapted to prevent the accumulation of rain, sleet, snow and ice on the windshield of an automobile or truck, particularly in front of the driver.

It is well-known that while the ordinary windshield wiper will remove moisture and rain from a windshield when the temperature is above the freezing point, nevertheless the ordinary windshield wiper is totally inadequate to prevent moisture, rain, sleet and snow from freezing on the windshield when the temperature is sufficiently low and that under such conditions, the vision of the driver is wholly obscured and it is necessary for him to either lean out of the window or to raise the windshield sufficiently high so that he can see beneath it a sufficient distance in advance to insure safe driving.

On the other hand, windshields of automobiles and trucks of the present day are, for the most part, so constructed that they slide or swing only to a limited extent and cannot be raised sufficiently to afford a clear view beneath them.

Many minor and major accidents occur due to the freezing of rain, sleet or snow on windshields and to prevent this action, various attempts have been made to deflect or blow away from the windshield the rain, snow, or sleet which would otherwise reach it. So far as I am aware, all such earlier attempts have been unsuccessful or impracticable for various reasons.

One of the reasons why earlier attempts in this direction have been unsuccessful is that the correct principle has not, until my invention, been discovered. Earlier attempts have been impracticable because they have proposed to blow heated air across the face of a part of the windshield, rather than outwardly and forwardly from the face of the windshield and, hence, have not prevented rain, sleet, and snow from striking the windshield, such prevention being necessary to successful windshield clearing where a blast of air is employed. Furthermore, earlier efforts have relied upon cumbersome attachments which, when there is neither rain, snow nor sleet in the air, are in the way, unsightly, obscure the driver's vision, and are unnecessary.

The object of the present invention is to provide an improved, simple, relatively inexpensive, and compact device adapted to be installed on an automobile or truck, preferably on the dash, and arranged to draw upon the air contained within the hood of the engine or from a suitable duct combined with the exhaust manifold of the engine and to direct or blow the warm or hot air thus derived forwardly and outwardly from in front of the windshield in the general region of the windshield through which the driver has vision of the road or street ahead of the car, thereby preventing rain, snow, and sleet from having access to that part of the windshield which should be unobstructed, to afford the driver a free view ahead of the car, even though the remaining area of the windshield is completely obscured by rain, sleet, and snow or ice.

Preferably, that part of the device which directs the heated air ahead of the windshield is removably connected to the fan or blower so that the said particular part of the device may be kept in the automobile, or at some suitable location, ready for quick attachment and use but, on the other hand, is intended to be detached and stored in the car or elsewhere when the condition of the weather does not require its use and there will then be no obstruction to vision throughout all parts of the windshield. To that extent, the heated air delivering part of the device is portable and readily applied or removed.

The fan is included in circuit with the battery of the car or truck and a suitable switch is provided so that, once the necessity for use of the device ceases, the fan motor can be stopped without even requiring the driver to get out of the car to remove the detachable air projecting part of the device.

By utilizing the much warmer air which is underneath the hood of the engine, or the considerably heated air derived from a duct or stove combined with the exhaust manifold, the air which is projected to repel snow, sleet and rain, also has the adaptability to melt snow and sleet for a certain distance ahead of the windshield and thus the windshield is kept entirely clear throughout such area of its surface as will enable the driver to clearly see ahead.

In the accompanying drawings:

Figure 1, is a perspective view looking from the outside toward the windshield of an automobile which is equipped with my invention, the engine hood being broken away to better disclose the fan;

Fig. 2, is a vertical section through the hood, dash, and windshield of an automobile, and through the device, illustrating how a duct or stove may be used in connection with the exhaust manifold for supplying heated air to the fan; and Fig. 3, is a detail view showing a modified delivery head.

The windshield appears at 1, the dash is shown at 2, the hood at 3 and the engine appears at 4.

The air contained within the hood 3 being very considerably warmer than the air directly in front of the windshield, my invention is designed to utilize this air, as shown in Fig. 1, or, to utilize air of even higher temperature radiated from the exhaust manifold 5, Fig. 2, so that the air projected ahead of the windshield 1, will have a greater tendency to melt snowflakes and liquefy sleet than if the cold outer air is used for the purpose of repelling rain, sleet, moisture and snow from the windshield.

There is a shell 6 which may be of metal or any suitable material and which has a delivery duct 7. This shell is attached by any suitable means to the dash 2, preferably on the front thereof and beneath the head 3. The air drawn into the shell 6 may be taken directly from the space beneath the hood 3, as shown in Fig. 1, or, the shell may be connected to a duct or stove 8, which is combined with the exhaust manifold 5, as shown in Fig. 2, so that air is drawn into the stove 8 from the space around the engine and beneath the hood 3, said air passing through the slot 9 and to the shell 6 to supply air of considerable temperature.

The means for sucking the air into the shell 6 is an electric fan 10 which is carried by the shaft of a suitable electric motor 11, the latter being in a circuit 12, which includes the battery 13 of the car or truck and there being provided at some point in said circuit a control switch 14 by which the driver may close or open the circuit 12 to cause operation or stoppage of the motor 11.

That part of the invention which receives the air from the outlet 7, is preferably detachably connected to said outlet in any suitable manner so that it may be removed at all times except when its use is required, without disturbing the installation 6, 7, 10, 11, and 8, if the construction shown in Fig. 2 be used.

In other words, means for sucking in the air and directing it upwardly into the outlet 7, is preferably permanently attached to the car but I am to be understood as not limiting the invention in that respect, as it is well within the spirit of the invention to provide a fan and shell drawing upon the air beneath the hood or from a stove and yet have such a fan and shell portable.

Referring first to Figs. 1 and 2, the means for receiving and propelling the air delivered by fan 10, comprises a tube or duct 15 and a delivery head 16, the latter being provided with suction cups 17 for holding it to the outer face of the windshield 1 and also having a packing cushion 18 which rests against the windshield. The tube or duct 15 is adapted to suitably connect with the part 7, either by fitting into it or over it or being attached by any suitable coupling means, whereby the device will be suitably held in upright position.

The head 16 is in the form of a ring of any desired shape, an elliptical ring being shown, said ring being open at its front to provide a delivery mouth 19 and open at its rear so that there will be provided a free, uncovered and unobstructed area 20 of the windshield 1 through which the driver may have vision of the road or street ahead. The heated air blown upwardly by the fan 10 is delivered to the hollow interior 21 of the head through a port 22 and is forcibly blown in front of the windshield for the purpose of repelling the moisture, rain, snow or sleet so that the driver can envision the road or street through the area 20 of the windshield, even though the entire remainder of the windshield is covered with sleet or ice. In addition, the temperature of the air is such that it tends to liquefy snow and sleet.

The modification shown in Fig. 3 resides merely in the head 16ª which is of circular or any other endless form, being hollow and provided with either a continuous slot 23 or slots or perforations through which the air is directed forwardly to effect the same purpose previously described.

What I claim is:

1. Means for clearing an automobile or truck windshield, embodying an electric fan carried by the body of the automobile or truck, and an air projector connected to the automobile or truck and located wholly in front of the windshield, and a quick-detachable connection for the air projector, enabling said air projector to be removed at will without disturbing the fan.

2. Means for clearing an automobile or truck windshield, embodying a shell or casing carried by the body of the automobile or truck and having an outlet, a fan arranged to draw into said shell or casing air from beneath the engine hood of the automobile or truck and to force this air into said outlet, and an air projector connected to the aforesaid outlet by a quick-detachable joint and located wholly in front of the windshield, said air projector being adapted to propel air in front of the windshield and to define on the windshield a space or area through which the driver may view the street or road ahead of the car or truck, said quick-detachable joint enabling said air projector to be removed at will without disturbing the fan.

3. Means for clearing an automobile or truck windshield, embodying a shell or casing carried by the body of the car and having an outlet, a duct combined with the exhaust manifold of the engine of the car or truck and communicating with said shell or casing, an electrically driven fan operating in said shell or casing which draws air from said duct and forces it into said outlet, and a ring shaped unitary quick attachable and detachable air projector adapted to be located wholly in front of the windshield and in contact with the outer face therewith which has a conduit detachably connected to the aforesaid outlet and is adapted to discharge or project forwardly and outwardly away from its ring-shaped part the heated air blown by the fan, said ring-shaped part defining on the windshield and ahead thereof a space or area through which the driver may view the street or road ahead of the car or truck.

In testimony whereof I affix my signature.

JOHN A. KELLER.